United States Patent
Huang

(10) Patent No.: US 10,630,906 B2
(45) Date of Patent: Apr. 21, 2020

(54) IMAGING CONTROL METHOD, ELECTRONIC DEVICE AND COMPUTER READABLE STORAGE MEDIUM

(71) Applicant: Guangdong OPPO Mobile Telecommunications Corp., Ltd., Dongguan, Guangdong (CN)

(72) Inventor: Jiewen Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/249,525

(22) Filed: Jan. 16, 2019

(65) Prior Publication Data

US 2020/0053265 A1  Feb. 13, 2020

(30) Foreign Application Priority Data

Aug. 13, 2018 (CN) .......................... 2018 1 0916158

(51) Int. Cl.
*H04N 5/235* (2006.01)
*G06K 9/00* (2006.01)
*G06T 5/40* (2006.01)

(52) U.S. Cl.
CPC ......... *H04N 5/2351* (2013.01); *H04N 5/2353* (2013.01); *H04N 5/2355* (2013.01); *G06K 9/00228* (2013.01); *G06T 5/40* (2013.01)

(58) Field of Classification Search
CPC .. H04N 5/2351; H04N 5/2353; H04N 5/2354; H04N 5/2355; H04N 5/2356; G06K 9/00228; G06T 5/40
USPC ........ 348/216.1, 362, 221.1, 222.1, 92, 366, 348/687, 132, 371–376; 382/274, 284
See application file for complete search history.

(56) References Cited

U.S. PATENT DOCUMENTS

| | | | |
|---|---|---|---|
| 7,495,699 B2 * | 2/2009 | Nayar | H04N 5/2351 348/262 |
| 8,466,976 B2 * | 1/2013 | Morales | H04N 5/235 348/221.1 |

(Continued)

FOREIGN PATENT DOCUMENTS

| | | |
|---|---|---|
| CN | 101102417 A | 1/2008 |
| CN | 103699877 A | 4/2014 |

(Continued)

OTHER PUBLICATIONS

Extended European Search Report from corresponding European Patent Application No. 19151898.4 dated May 27, 2019.

(Continued)

*Primary Examiner* — Marly S Camargo
(74) *Attorney, Agent, or Firm* — Young Basile Hanlon & MacFarlane, P.C.

(57) ABSTRACT

An imaging control method, an electronic device and a computer readable storage medium are provided. The imaging control method includes: determining a target combination from a plurality of preset exposure level combinations according to a brightness of a shooting scene; performing shooting according to each exposure level comprised in the target combination to obtain a corresponding image of each exposure level; and performing synthesis processing on images of the plurality of exposure levels of the target combination.

18 Claims, 3 Drawing Sheets

(56) References Cited

U.S. PATENT DOCUMENTS

| | | | |
|---|---|---|---|
| 10,498,971 B2* | 12/2019 | Bagaria | H04N 5/235 348/262 |
| 2004/0218087 A1* | 11/2004 | Jazbutis | H04N 5/2353 348/362 |
| 2004/0263648 A1* | 12/2004 | Mouli | H04N 5/335 348/222.1 |
| 2005/0030435 A1* | 2/2005 | Uemura | H04N 9/12 348/742 |
| 2006/0140510 A1* | 6/2006 | Wallace | G06K 9/36 382/294 |
| 2009/0153697 A1* | 6/2009 | King | H04N 5/235 348/229.1 |
| 2011/0304820 A1* | 12/2011 | Falk | 351/206 |
| 2012/0105681 A1* | 5/2012 | Morales | H04N 5/235 348/221.1 |
| 2012/0274801 A1 | 11/2012 | Oyachi | |
| 2013/0070965 A1* | 3/2013 | Jang | G06K 9/00362 382/103 |
| 2013/0215296 A1 | 8/2013 | Oniki et al. | |
| 2014/0028872 A1 | 1/2014 | Lee et al. | |
| 2014/0267883 A1 | 9/2014 | Vidal-Naquet | |
| 2015/0229819 A1 | 8/2015 | Rivard et al. | |
| 2018/0084181 A1 | 3/2018 | Sachs et al. | |
| 2018/0276482 A1* | 9/2018 | Singh | G06K 9/0075 348/149 |
| 2019/0313005 A1* | 10/2019 | Kuang | H04N 5/2355 348/223 |
| 2019/0335079 A1* | 10/2019 | Koizumi | H04N 5/2324 348/239 |

FOREIGN PATENT DOCUMENTS

| | | |
|---|---|---|
| CN | 103813097 A | 5/2014 |
| CN | 104333708 A | 2/2015 |
| CN | 104902168 A | 9/2015 |
| CN | 105516613 A | 4/2016 |
| CN | 105791707 A | 7/2016 |
| CN | 107241557 A | 10/2017 |
| CN | 107463052 A | 12/2017 |
| CN | 107566748 A | 1/2018 |
| CN | 107566749 A | 1/2018 |
| CN | 108391059 A | 8/2018 |
| CN | 108683862 A | 10/2018 |
| EP | 1814315 A1 | 8/2007 |
| JP | 2017153154 A | 8/2017 |
| WO | 03083773 A2 | 10/2003 |

OTHER PUBLICATIONS

International search report issued in corresponding international application No. PCT/CN2019/090197, dated Aug. 28, 2019 (10 pages).

English Translation of Notice of Allowance dated Nov. 27, 2019 for Chinese Application No. 201810916158.1.

* cited by examiner

IMAGING CONTROL METHOD, ELECTRONIC DEVICE AND COMPUTER READABLE STORAGE MEDIUM

CROSS-REFERENCE TO RELATED APPLICATION(S)

This application claims priority to Chinese Patent Application No. 201810916158.1 filed on Aug. 13, 2018, the entire disclosure of which is hereby incorporated by reference.

TECHNICAL FIELD

Implementations of the present disclosure relate to, but are not limited to, the technical field of electronic device, in particular to an imaging control method, an electronic device and a computer readable storage medium.

BACKGROUND

With continuous development of terminal technology, more and more users use electronic devices to shoot images. When the user takes a selfie with the front camera of the electronic device, the user is between the light source and the electronic device, hence the face exposure is likely to be insufficient. If the face brightness is improved by adjusting the exposure level, the background area will be overexposed and the shooting scene will not even be clearly displayed.

At present, in order to improve the shooting quality in high dynamic range scenes such as backlighting, in the shooting process, long exposure, medium exposure and short exposure are respectively performed by controlling the pixel array, and then images obtained at different exposure levels are synthesized and output for imaging, so as to improve the imaging effect of the images. However, the imaging quality of the images shot in this way will change with the shooting scene. When the dynamic range of a real scene is beyond or below the dynamic range that can be represented by a fixed exposure ratio, effect of the wide dynamic image obtained with the fixed exposure ratio is usually bad, thereby such single shooting mode cannot adapt to multiple shooting scenes.

SUMMARY

Implementations of the present disclosure provide an imaging control method, an electronic device and a computer readable storage medium.

In one aspect, an imaging control method is provided, which may include: determining a target combination from a plurality of preset exposure level combinations according to a brightness of a shooting scene; wherein, in the plurality of preset exposure level combinations, each exposure level combination comprises at least two exposure levels; obtaining a plurality of images according to a plurality of exposure level levels in the target commination; and performing synthesis processing on the obtained plurality of images.

In another aspect, an electronic device is provided, which may include a storage, a processor and a computer program stored in the storage and executable by the processor to perform acts of: determining a target combination from a plurality of preset exposure level combinations according to a brightness of a shooting scene, wherein, in the plurality of preset exposure level combinations, each exposure level combination comprises at least two exposure levels; obtaining a plurality of images according to a plurality of exposure level levels in the target commination; and performing synthesis processing on the obtained plurality of images.

In yet another aspect, a computer readable storage medium is provided, which may include a computer program that is executable by a processor to perform acts of: determining a target combination from a plurality of preset exposure level combinations according to a brightness of a shooting scene; wherein, in the plurality of preset exposure level combinations, each exposure level combination comprises at least two exposure levels; obtaining a plurality of images according to a plurality of exposure level levels in the target commination; and performing synthesis processing on the obtained plurality of images.

A better understanding of the nature and advantages of implementations of the present disclosure may be gained with reference to the following detailed description and the accompanying drawings.

BRIEF DESCRIPTION OF DRAWINGS

The accompanying drawings are used to provide a further understanding of technical solutions of the present disclosure and form a part of the specification, and are used to explain the technical solutions of the present disclosure together with the implementations of the present disclosure, but do not constitute a limitation on the technical solutions of the present disclosure.

DETAILED DESCRIPTION

Figure 1:
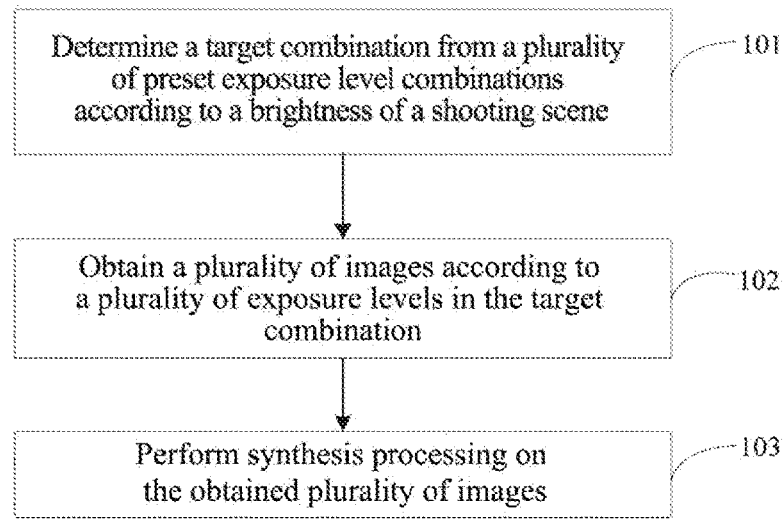
FIG. 1 is a flowchart of an imaging control method according to an implementation of the present disclosure.

Implementations of the present disclosure are described in detail below, examples of the implementations are shown in the accompanying drawings, in which the same or similar reference numerals refer to the same or similar elements or elements having the same or similar functions throughout. The implementations described below with reference to the drawings are exemplary and are intended to be used to explain the present disclosure but are not to be construed as limiting the present disclosure.

The imaging control method and device provided by implementations of the present disclosure will be described below with reference to the accompanying drawings.

FIG. 1 is a flowchart of an imaging control method according to an implementation of the present disclosure. The imaging control method may be applied to imaging devices such as cameras, mobile phones with photographing functions, tablet computers, etc. As shown in FIG. 1, the imaging control method may include acts 101, 102, and 103.

In act 101, a target combination is determined from a plurality of preset exposure level combinations according to a brightness of a shooting scene. One exposure level combination includes at least two exposure levels, and different exposure level combinations are different in at least one of the following aspects: quantities of exposure levels in the exposure level combinations, and values of exposure levels in the exposure level combinations.

In an exemplary implementation, a separate light measurement device may be used to measure the brightness of the shooting scene, or a camera may read an ISO value automatically adjusted by the camera and determine the brightness of the shooting scene according to the read ISO value, or the pixel cell array of an imaging device may be controlled to measure an environment brightness value and determine the brightness of the shooting scene according to the measured environment brightness value, which is not restricted in the present application.

The ISO value is used to indicate the sensitivity of the camera, and ISO values commonly used are 100, 200, 400, 1000, 1600, etc. The camera may automatically adjust the ISO value according to the environment brightness, and thus in an exemplary implementation, the brightness of the shooting scene may be deduced according to the ISO value. Generally, the ISO value may be 100 or 200 in the case of sufficient light, and 1000 or higher in the case of insufficient light.

When the shooting scene in which the imaging device is located is different, the brightness of the shooting scene may be also different. Multiple exposure level combinations may be preset according to the brightness and dynamic range of the shooting scene. Thereby, a target combination may be determined from the preset multiple exposure level combinations according to the user's requirements and an actual shooting scene, that is, an appropriate exposure level combination may be determined. Herein, one exposure level combination includes at least two exposure level values (EVs), and different exposure level combinations are different in at least one of the following aspects: quantities of exposure levels in the exposure level combinations, and values of exposure levels in the exposure level combinations. exposure level is the degree of exposing a preview image in the imaging device, that is, how much light is received. The higher the exposure level, the whiter the image, and the lower the exposure level, the darker the image.

For example, an exposure level combination may include several exposure levels with the same value, or several exposure levels with different values from each other, or several exposure levels with the same value and several exposure levels with different values. That is, different exposure level combinations are different in at least one of the following aspects: quantities of exposure levels in the exposure level combinations, and values of exposure levels in the exposure level combinations.

In an exemplary implementation, a preset exposure level combination may include an exposure level combination of a first type and an exposure level combination of a second type; the exposure level combination of the first type may include at least three exposure levels with different values from each other; and the exposure level combination of the second type may include at least two first exposure levels and at least one second exposure level, wherein the value of the first exposure level is greater than the value of the second exposure level.

In act 102, a plurality of images are obtained according to a plurality of exposure levels in the target combination.

For example, after the target combination is determined from a plurality of preset exposure level combinations according to the brightness of the shooting scene in which the imaging device is located, shooting may be performed according to each exposure level included in the target combination to obtain a corresponding image of each exposure.

An exposure level combination includes at least two exposure levels, and when the exposure levels are different, shot images have different effects. For example, in the case of overexposure, a shot image will be too bright. In the case of underexposure, a shot image will be too dark. Hence shooting should be performed at each exposure level to obtain a corresponding image of each exposure level.

In act 103, synthesis processing is performed on images of the obtained plurality of images.

For example, the imaging device may perform shooting at each exposure level to obtain a corresponding image of each exposure level. Due to different exposure levels, some details of the obtained image may be too bright or too dark. Thus, synthesis processing is performed on the obtained images of the multiple exposure levels so as to obtain a satisfying image.

In an exemplary implementation, after act 103, the imaging control method may further include using the synthesized image as a shot image to be displayed or stored. For example, the synthesized image may be displayed as a shot image on a display of an electronic device or stored in a storage of an electronic device.

According to the imaging control method, a target combination is determined from a plurality of preset exposure level combinations according to the brightness of the shooting scene, wherein one exposure level combination includes at least two exposure levels, and different exposure level combinations are different in at least one of the following aspects: quantities of exposure levels in the exposure level combinations, and values of exposure levels in the exposure level combinations; and then shooting is performed according to each exposure level contained in the target combination to obtain a corresponding image of each exposure level, and then the images of multiple exposure levels are synthesized. Thereby, according to the brightness of the shooting scene, an appropriate exposure level combination (i.e., a target combination) can be determined, shooting can be performed according to each exposure level in the appropriate exposure level combination, and synthesis processing can be performed on the resulting images of multiple exposure levels, thereby avoiding the situation that the images are too bright or too dark, hence improving the imaging effect and imaging quality, and improving the user's shooting experience.

Figure 2:
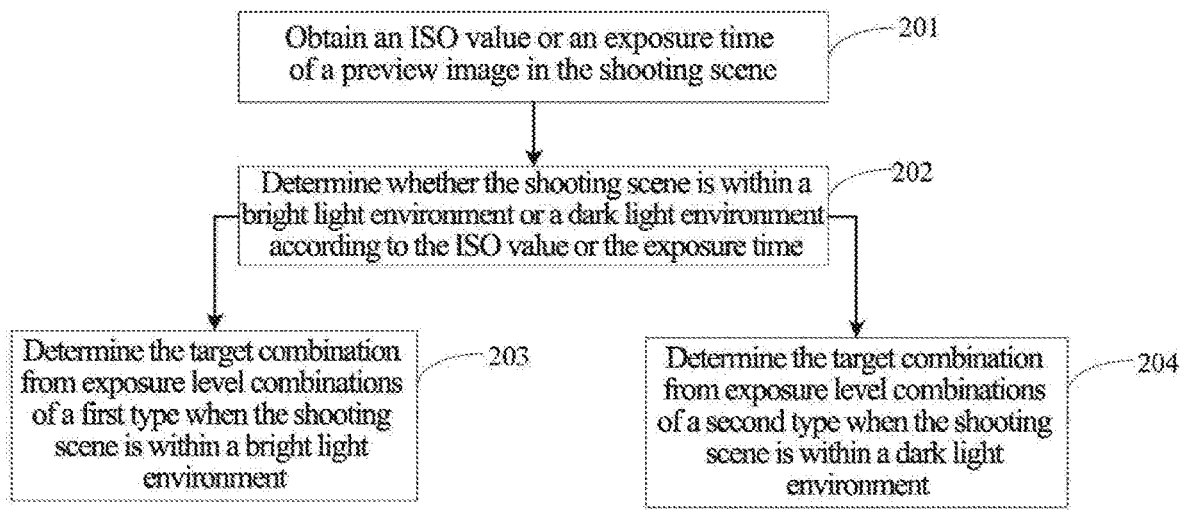
FIG. 2 is a partial flowchart of an imaging control method according to another implementation of the present disclosure.

In an exemplary implementation, referring to FIG. 2, before the act 101, the imaging control method may further include acts 201 and 202.

In act 201, an ISO value or an exposure time of a preview image in a shooting scene is obtained.

For example, the ISO value or the exposure time of the preview image of the imaging device in the shooting scene may be obtained, where the ISO value is used to indicate the sensitivity of the camera. For example, the ISO value of the preview image in the shooting scene may be obtained by reading the ISO value automatically adjusted by the camera of the imaging device.

In an exemplary implementation, the exposure time may be preset in a built-in program of the imaging device, or it may be set by a user so that the exposure time of the preview image in the shooting scene may be obtained by the imaging device.

In act 202, the brightness of the shooting scene is determined according to the ISO value or the exposure time, for example, it is determined whether the shooting scene is within a bright light environment.

In an exemplary implementation, determining the brightness of the shooting scene according to the ISO value or the exposure time may include:

If the ISO value is less than or equal to a first parameter threshold, or the exposure time is less than or equal to a second parameter threshold, it is determined that the shooting scene is within a bright light environment;

If the ISO value is greater than the first parameter threshold or the exposure time is greater than the second parameter threshold, it is determined that the shooting scene is within a dark light environment.

The first parameter threshold and the second parameter threshold are preset parameter values for determining whether the shooting scene is within a bright light environment or a dark light environment. The first parameter threshold and the second parameter threshold may be preset in the built-in program of the imaging device or may be set by the user.

In general, the camera of the imaging device may automatically adjust the ISO value or the exposure time of the preview image according to an environment brightness, hence the environment brightness of the shooting scene may be deduced according to the ISO value or the exposure time.

For example, by comparing the obtained ISO value of the preview image in the shooting scene with the first parameter threshold, it may be determined whether the current shooting scene is within a bright light environment or a dark light environment according to the comparison result. Alternatively, by comparing the obtained exposure time of the preview image in the shooting scene with the second parameter threshold, it may be determined whether the current shooting scene is within a bright light environment or a dark light environment according to the comparison result. For example, when the ISO value of the preview image in the shooting scene is less than or equal to the first parameter threshold, it is determined that the current shooting scene is within a bright light environment, and when the ISO value of the preview image in the shooting scene is greater than the first parameter threshold, it is determined that the current shooting scene is within a dark light environment. Alternatively, when the exposure time of the preview image in the shooting scene is less than or equal to the second parameter threshold, it is determined that the current shooting scene is within a bright light environment; when the exposure time of the preview image in the shooting scene is greater than the second parameter threshold, it is determined that the current shooting scene is within a dark light environment. The first parameter threshold may be set to 1600 and the second parameter threshold may be set to 50ms (milliseconds).

In another exemplary implementation, a first parameter range corresponding to the ISO value may be set, and the brightness of the shooting scene may be determined by determining whether the obtained ISO value of the preview image in the shooting scene is within the first parameter range. For example, if the ISO value of the preview image in the shooting scene is within the first parameter range, it is determined that the current shooting scene is within a bright light environment, and if the ISO value of the preview image in the shooting scene is not within the first parameter range, it is determined that the current shooting scene is within a dark light environment. Alternatively, a second parameter range corresponding to the exposure time may be set, and the brightness of the shooting scene may be determined by determining whether the obtained exposure time of the preview image in the shooting scene is within the second parameter range. For example, if the obtained exposure time of the preview image in the shooting scene is within the second parameter range, it is determined that the current shooting scene is within a bright light environment, and if the obtained exposure time of the preview image in the shooting scene is not within the second parameter range, it is determined that the current shooting scene is within a dark light environment. The first parameter range and the second parameter range may be preset in the built-in program of the imaging device, or may be set by the user, which is not restricted in the present application.

Referring to FIG. 2, the act 101 may include acts 203 and 204.

In act 203, if the shooting scene is within a bright light environment, the target combination is determined from the exposure level combinations of a first type, and an exposure level combination of the first type includes at least three exposure levels with different values from each other.

For example, when the ISO value of the preview image in the shooting scene is less than or equal to the first parameter threshold or the exposure time is less than or equal to the second parameter threshold, it is determined that the current shooting scene is within a bright light environment, and then the target combination may be determined from the exposure level combinations of the first type according to at least one of the following factors: whether the preview image of the imaging device contains a human face, and a dynamic range of the preview image. The exposure level combination of the first type may include at least three exposure levels with different values from each other.

In an exemplary implementation, before determining the target combination from the exposure level combinations of the first type according to at least one of the following factors: whether the preview image contains a human face, and a dynamic range of the preview image, the dynamic range of the preview image is firstly determined according to a brightness histogram of the preview image or according to a brightness of each region in the preview image. The dynamic range may include a first dynamic range, a second dynamic range and a third dynamic range, wherein the first dynamic range is wider than the second dynamic range, and the second dynamic range is wider than the third dynamic range.

In an exemplary implementation, the dynamic range of the preview image may be determined according to a brightness of each region in the preview image, such as determining whether the preview image is of a first dynamic range, a second dynamic range, or a third dynamic range.

In another exemplary implementation, when an imaging device shoots a preview image, a brightness histogram of the preview image may be generated according to a brightness level of each pixel measured by each photosensitive pixel cell in a photosensitive pixel cell array, and then the dynamic range of the preview image may be determined according to the proportion of the number of pixels of each brightness level. The abscissa of the brightness histogram of the preview image represents the brightness level of pixels measured by photosensitive pixel cells, and the ordinate represents the number of pixels of each brightness level.

For example, when most of the pixels of the preview image are distributed in regions with small brightness values in the brightness histogram, it is determined that the brightness of various regions of the current preview image is low and the preview image is of a first dynamic range. When the pixels of the preview image are uniformly distributed in the brightness histogram, it is determined that the brightness of various regions of the current preview image is relatively uniform, and the preview image is of a second dynamic range. When most of the pixels of the preview image are distributed in regions with large brightness values in the brightness histogram, it is determined that the brightness of various regions of the current preview image is high and the preview image is of a third dynamic range.

When the shooting scene is within a bright light environment the maximum value of exposure levels in a corresponding target combination when a preview image contains a human face is less than or equal to the maximum value of exposure levels in a corresponding target combination when a preview image does not contain a human face; and the minimum value of exposure levels in a corresponding target combination when a preview image contains a human face is less than or equal to the minimum exposure level value in a corresponding target combination when a preview image does not contain a human face, if the preview images are of the same dynamic range (i.e. the dynamic ranges of the preview images are the same, for example, the preview images are in a first dynamic range, or a second dynamic range, or a third dynamic range).

For example, exposure level combinations of the first type with respect to whether the preview image contains a human face and various dynamic ranges of the preview image, as shown in the following table, may be pre-stored.

| Dynamic ranges | Exposure level combinations of the first type when a human face is detected | Exposure level combinations of the first type when a human face is not detected |
| --- | --- | --- |
| Low | EV0, EV-2.5, EV1 | EV0, EV-2, EV1 |
| Medium | EV0, EV-3, EV1 | EV0, EV-2.5, EV1.5 |
| High | EV0, EV-4, EV1 | EV0, EV-3.5, EV1.5 |

According to the above table, when the shooting scene is within a bright light environment and the preview image is of a first dynamic range, values of the exposure levels in the corresponding target combination when the preview image contains a human face may include EV0, EV-4, EV1. Hence the maximum value of exposure levels is EV1, and the minimum value of exposure levels is EV-4. Values of exposure levels in the corresponding target combination when the preview image does not contain a human face may include EV0, EV-3.5, EV1.5, and thus the maximum value of exposure levels is EV1.5, and the minimum value of exposure levels is EV-3.5. The maximum value (i.e., EV1) of exposure levels in the corresponding target combination when the preview image contains a human face is smaller than the maximum value (i.e., EV1.5) of exposure levels in the corresponding target combination when the preview image does not contain a human face. The minimum value (i.e., EV-4) of exposure levels in the corresponding target combination when the preview image contains a human face is smaller than the minimum value (i.e., EV-3.5) of exposure levels in the corresponding target combination when the preview image does not contain a human face.

In an exemplary implementation, a separate light measurement device may be used to measure the brightness of each region in the preview image; or, the ISO value automatically adjusted by the camera may be read to determine the brightness of each region in the preview image according to the read ISO value; or, the pixel cell array may be controlled to measure an environment brightness value to determine the brightness of each region in the preview image according to the measured environment brightness value, which is not restricted in the present disclosure. After determining the brightness of each region in the preview image, the dynamic range of the preview image may be determined according to the brightness, for example, determining whether the preview image is of a first dynamic range, a second dynamic range or a third dynamic range.

In act 204, if the shooting scene is within a dark light environment, the target combination is determined from the exposure level combinations of a second type.

For example, when the obtained ISO value of the preview image in the shooting scene is greater than the first parameter threshold or the exposure time is greater than the second parameter threshold, it is determined that the current shooting scene is within a dark light environment, and the target combination may be determined from the exposure level combinations of the second type.

An exposure level combination of the second type may include at least two first exposure levels and at least one second exposure level, wherein the value of the first exposure level is greater than the value of the second exposure level. For example, an exposure level combination of the second type may include four first exposure levels with the values being EV0 and one second exposure level with the value being EV-4. In this example, an exposure level combination of the second type may include a plurality of first exposure levels for medium exposure and a second exposure level for low exposure, thereby adapted to dark light environments and scenes with large image noise, and facilitating image noise suppression through multiple medium exposures.

According to the imaging control method, whether a shooting scene is within a bright light environment is determined according to the ISO value or the exposure time of the preview image obtained in the shooting scene. If the shooting scene is within a bright light environment, the target combination is determined from the exposure level combinations of the first type. If the shooting scene is within a dark light environment, the target combination is determined from the exposure level combinations of the second type. Thereby, by determining whether the shooting scene is within a bright light environment or a dark light environment, and then selecting a corresponding target combination, the imaging quality and the imaging effect may be improved.

Figure 3:
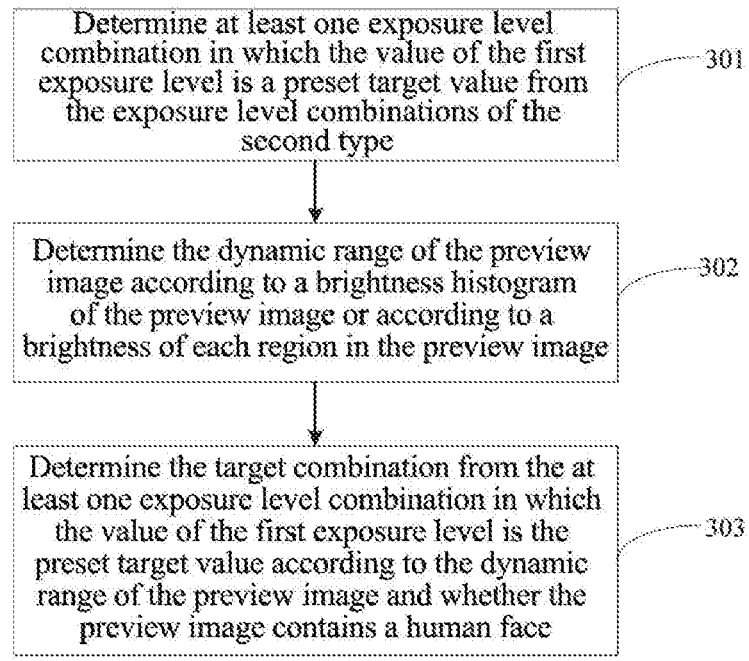
FIG. 3 is a partial flowchart of an imaging control method according to yet another implementation of the present disclosure.

In an exemplary implementation, referring to FIG. 3, the act 204 may include act 301, act 302, and act 303.

In act 301, at least one exposure level combination in which the value of the first exposure level is a preset target value is determined from the exposure level combinations of the second type.

In an exemplary implementation, the preset target value may be a value of an exposure level preset by a user in the imaging device according to the environment brightness of the shooting scene.

All the exposure level combinations which include a first exposure level of which the value is the preset target value may be determined from the exposure level combinations of the second type.

In act 302, the dynamic range of the preview image is determined according to a brightness histogram of the preview image or according to a brightness of each region in the preview image. The dynamic range may include a first dynamic range, a second dynamic range and a third dynamic range, wherein the first dynamic range is wider than the second dynamic range, and the second dynamic range is wider than the third dynamic range.

In an exemplary implementation, an approach for determining the dynamic range of the preview image may be similar as that described above for act 203, and will not be repeated here.

In act 303, according to the determined dynamic range of the preview image and whether the preview image contains a human face, the target combination is determined from the at least one exposure level combination in which the value of the first exposure level is the preset target value.

For example, according to the dynamic range of the preview image and whether the preview image contains a human face determined in act 302, an applicable second exposure level may be determined, and the value of the second exposure level may generally be between EV-3 and EV-4. The determined target combination may be an exposure level combination of the second type in which the value of a first exposure level is the preset target value and the value of a second exposure level is between EV-3 and EV-4.

Generally, when the shooting scene is within a dark light environment, the value of the second exposure level in a corresponding target combination when a preview image contains a human face is less than or equal to the value of the second exposure level in a corresponding target combination when a preview image does not contain a human face if the preview images are of the same dynamic range (i.e. the dynamic ranges of the preview images are the same, for example, the preview images are in a first dynamic range, or a second dynamic range, or a third dynamic range). This is because when a human face is detected in the preview image, in order to improve the brightness of the human face, exposure control is often performed based on the human face, resulting in severe background overexposure. Therefore, when the preview image contains a human face, based on exposure control on the human face, the exposure level is adjusted to appropriately reduce the exposure level, thus avoiding background overexposure.

In an exemplary implementation, after determining at least one exposure level combination in which the value of the first exposure level is the preset target value from the exposure level combinations of the second type, the target combination may be determined from the at least one exposure level combination according to the dynamic range of the preview image; or, the target combination may be determined from the at least one exposure level combination according to whether the preview image contains a human face.

With the imaging control method, at least one exposure level combination in which the value of the first exposure level is the preset target value is determined from the exposure level combinations of the second type, the dynamic range of the preview image is determined according to the brightness histogram of the preview image or according to the brightness of each region in the preview image, and then the target combination is determined from the at least one exposure level combination in which the value of the first exposure level is the preset target value according to at least one of the following factors: the determined dynamic range of the preview image, and whether the preview image contains a human face. When the shooting scene is within the dark light environment, a corresponding target combination is determined according to at least one of the following factors: the dynamic range of the preview image, and whether the preview image contains a human face, thereby improving the imaging quality and imaging effect and improving the user's shooting experience.

Figure 4:
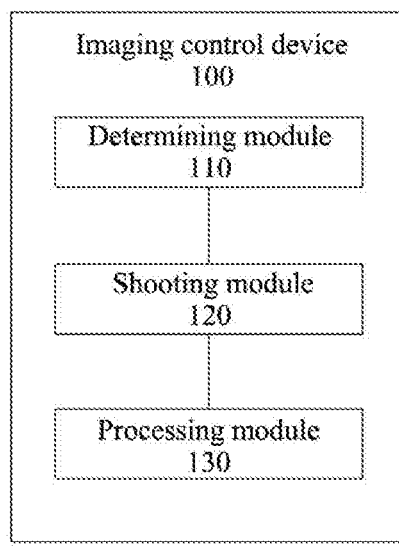
FIG. 4 is a schematic diagram of the structure of an imaging control device according to an implementation of the present disclosure.

FIG. 4 is a schematic diagram of the structure of an imaging control device according to an implementation of the present disclosure. The imaging control device 100, for example, may be applied to an imaging device, and as shown in FIG. 4, may include a determining module 110, a shooting module 120, and a processing module 130.

The determining module 110 may be configured to determine a target combination from a plurality of preset exposure level combinations according to a brightness of a shooting scene; wherein one exposure level combination includes at least two exposure levels, and different exposure level combinations are different in at least one of the following aspects: quantities of exposure levels in the exposure level combinations, and values of exposure levels in the exposure level combinations.

The shooting module 120 may be configured to perform shooting according to each exposure level included in the target combination to obtain a corresponding image of each exposure level.

The processing module 130 may be configured to perform synthesis processing on images of the plurality of exposure levels of the target combination.

In an exemplary implementation, the determining module 110 may further include an obtaining unit and a first determining unit.

The obtaining unit may be configured to obtain an ISO value or an exposure time of a preview image in a shooting scene.

The first determining unit may be configured to determine whether the shooting scene is within a bright light environment according to the ISO value or the exposure time.

In an exemplary implementation, the determining module 110 may further include a second determining unit and a third determining unit.

The second determining unit may be configured to determine a target combination from exposure level combinations of a first type when the shooting scene is within a bright light environment; wherein an exposure level combination of the first type includes at least three exposure levels with different values from each other.

The third determining unit may be configured to determine a target combination from exposure level combinations of a second type when the shooting scene is within a dark light environment; wherein an exposure level combination of the second type includes at least two first exposure levels and at least one second exposure level, wherein the value of the first exposure level is greater than the value of the second exposure level.

In an exemplary implementation, the second determining unit may be configured to determine the target combination from the exposure level combinations of the first type according to at least one of the following factors: whether the preview image contains a human face, and the dynamic range of the preview image.

In an exemplary implementation, the second determining unit may also be configured to determine the dynamic range of the preview image according to a brightness histogram of the preview image or according to a brightness of each region in the preview image. For example, the dynamic range may include a first dynamic range, a second dynamic range, and a third dynamic range, wherein the first dynamic range is wider than the second dynamic range, and the second dynamic range is wider than the third dynamic range.

In an exemplary implementation, the third determining unit may be configured to determine at least one exposure level combination in which the value of the first exposure level is a preset target value from the exposure level combinations of the second type; determine the dynamic range of the preview image according to the brightness histogram of the preview image or according to the brightness of each region in the preview image; determine the target combination from the at least one exposure level combination in which the value of the first exposure level is the preset target value according to at least one of the following factors: the determined dynamic range of the preview image, and whether the preview image contains a human face. The dynamic range may include a first dynamic range, a second dynamic range and a third dynamic range. The first dynamic range is wider than the second dynamic range, and the second dynamic range is wider than the third dynamic range.

In an exemplary implementation, the imaging control device 100 may further include at least one of a display module and a storage module.

The display module is configured to display a synthesized image as a shot image;

The storage module is configured to store a synthesized image as a shot image.

With the imaging control device, the target combination is determined from a plurality of preset exposure level combinations according to the brightness of the shooting scene, wherein one exposure level combination includes at least two exposure levels, and different exposure level combinations are different in at least one of the following aspects: quantities of exposure levels in the exposure level combinations, and values of exposure levels in the exposure level combinations; shooting is performed according to each exposure level included in the target combination to obtain a corresponding image of each exposure level; synthesis processing is performed on images of a plurality of exposure levels of the target combination. Thereby, according to the brightness of the shooting scene, an appropriate exposure level combination (i.e., a target combination) may be determined, and shooting can be performed according to each exposure level in the appropriate exposure level combination, synthesis processing can be performed on the resulting images of multiple exposure levels, thereby the situation that an image is too bright or too dark is avoided, the imaging effect and the imaging quality can be improved, and the user's shooting experience can be improved.

The foregoing explanation of the implementation of the imaging control method may also apply to the imaging control device of this implementation, and will not be repeated here.

An implementation of the present disclosure also provides an electronic device (such as the imaging device described above), which may include a storage, a processor and a computer program stored in the storage and executable on the processor. When the processor executes the computer program, the imaging control method described above is realized, for example, the following acts are performed: determining a target combination from a plurality of preset exposure level combinations according to a brightness of a shooting scene; wherein one exposure level combination includes at least two exposure levels, and different exposure level combinations are different in at least one of the following aspects: quantities of exposure levels in the exposure level combinations, or values of exposure levels in the exposure level combinations; shooting according to each exposure level included in the target combination to obtain a corresponding image of each exposure level; and performing synthesis processing on images of a plurality of exposure levels of the target combination.

In an exemplary implementation, when the processor executes the computer program, the following acts may be performed:

if the shooting scene is within a bright light environment, determining a target combination from exposure level combinations of a first type; wherein an exposure level combination of the first type includes at least three exposure levels with different values from each other; if the shooting scene is within a dark light environment, determining a target combination from the exposure level combinations of a second type; herein an exposure level combination of the second type includes at least two first exposure levels and at least one second exposure level, wherein the value of the first exposure level is greater than the value of the second exposure level.

In an exemplary implementation, when the processor executes the computer program, the following acts may be performed: obtaining an ISO value or an exposure time of a preview image in the shooting scene; and determining the brightness of the shooting scene according to the ISO value or the exposure time.

In an exemplary implementation, when the processor executes the computer program, the following acts may be performed: determining the target combination from the exposure level combinations of the first type according to at least one of the following factors: whether the preview image contains a face in the shooting scene, and the dynamic range of the preview image.

In an exemplary implementation, when the shooting scene is within a bright light environment, the maximum value of exposure levels in a corresponding target combination when a preview image contains a human face is less than or equal to the maximum value of exposure levels in a corresponding target combination when a preview image does not contain a human face; and the minimum value of exposure levels in a corresponding target combination when a preview image contains a human face is less than or equal to the minimum value of exposure levels in a corresponding target combination when a preview image does not contain a human face, if the preview images are of the same dynamic range.

In an exemplary implementation, when the processor executes the computer program, the following acts may be performed: determining at least one exposure level combination in which the value of the first exposure level is a preset target value from the exposure level combinations of the second type; and determining the target combination from the at least one exposure level combination according to at least one of the following factors: whether the preview image in the shooting scene contains a human face, and the dynamic range of the preview image.

In an exemplary implementation, if the shooting scene is within a dark light environment, the value of the second exposure level in a corresponding target combination when a preview image contains a human face is less than or equal to the value of the second exposure level in a corresponding target combination when a preview image does not contain a human face, if the preview images are of the same dynamic range.

Figure 5:
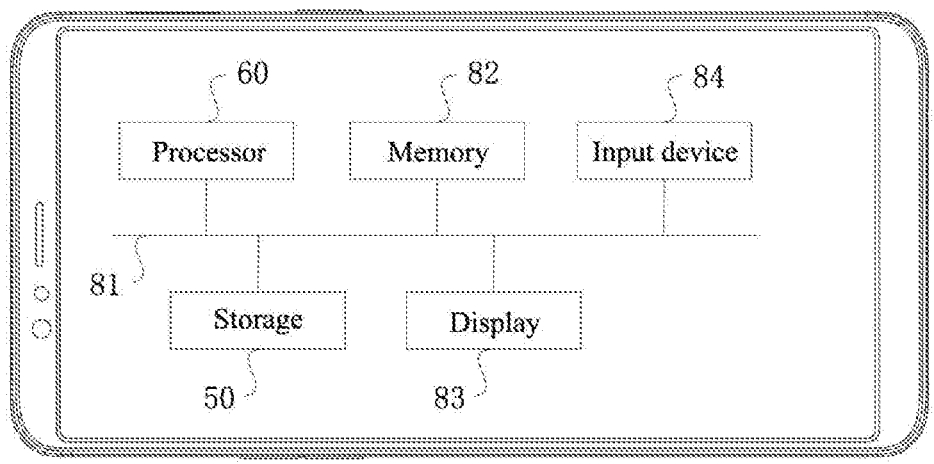
FIG. 5 is a block diagram of an electronic device according to an exemplary implementation of the present disclosure.

Referring to FIG. 5, an implementation of the present disclosure also provides an electronic device 200. The electronic device 200 includes a storage 50 and a processor 60. The storage 50 stores computer readable instructions, and when executed by the processor 60, the computer readable instructions cause the processor 60 to execute the imaging control method provided by any of the above implementations. For example, the following acts may be performed: determining a target combination from a plurality of preset exposure level combinations according to a brightness of a shooting scene, wherein, one exposure level combination includes at least two exposure levels, and different exposure level combinations are different in at least one of the following aspects: quantities of exposure levels in the exposure level combinations, and values of exposure levels in the exposure level combinations; performing shooting according to each exposure level included in the target combination to obtain a corresponding image of each exposure level; performing synthesis processing on images of a plurality of exposure levels of the target combination.

FIG. 5 is a schematic diagram of the internal structure of the electronic device 200 according to an exemplary implementation. The electronic device 200 may include a processor 60, a storage 50 (e.g., a non-volatile storage medium), a memory 82, a display 83, and an input device 84 connected via a system bus 81. The storage 50 of the electronic device 200 stores an operating system and computer readable instructions. The computer readable instructions may be executed by the processor 60 to realize the imaging control method in an implementation of the present disclosure. The processor 60 is used to provide computing and control capabilities to support the operation of the whole electronic device 200. The memory 82 of the electronic device 200 provides an environment for the execution of computer readable instructions in the storage 50. The display screen 83 of the electronic device 200 may be a liquid crystal display screen or an electronic ink display screen, etc. The input device 84 may be a touch layer covering on the display screen 83, or may be keys, a trackball or touch pad provided on the housing of the electronic device 200, or an external keyboard, touch pad or mouse, etc. The electronic device 200 may be a mobile phone, a tablet computer, a notebook computer, a personal digital assistant or a wearable device (e.g., a smart bracelet, a smart watch, a smart helmet, smart glasses), etc. Those skilled in the art could understand that the structure shown in FIG. 5 is only a schematic diagram of a part of the structure related to a technical solution of the present disclosure and does not constitute a limitation on the electronic device 200 to which the technical solution of the present disclosure is applied. The electronic device 200 may include more or fewer components than those shown in the FIG. 5, or may combine some components, or may have different arrangement of components.

Figure 6:
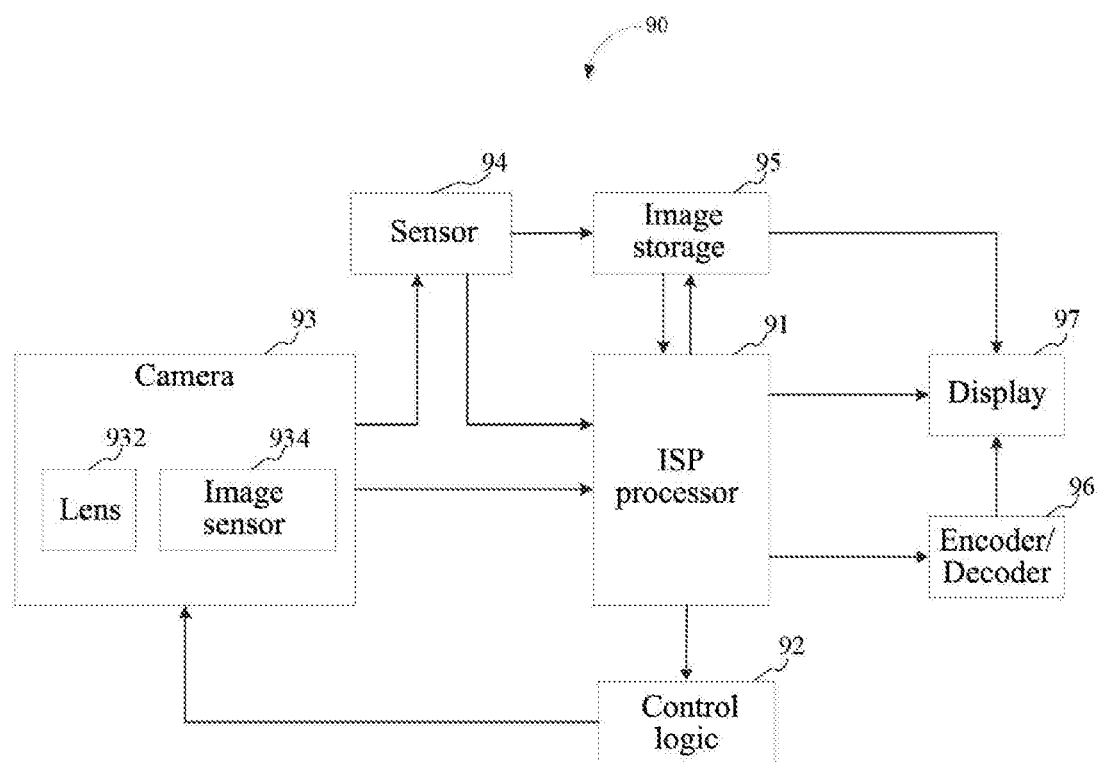
FIG. 6 is a block diagram of an image processing circuit according to an exemplary implementation of the present disclosure.

The electronic device 200 in an implementation of the present disclosure may include an image processing circuit 90, which may be realized by hardware and/or software components, including various processing units defining an Image Signal Processing (ISP) pipeline. FIG. 6 is a schematic diagram of an image processing circuit 90 in an exemplary implementation. As shown in FIG. 6, for ease of illustration, only those aspects of the image processing technology related to implementations of the present disclosure are shown.

As shown in FIG. 6, the image processing circuit 90 may include an ISP processor 91 (the ISP processor 91 may be the processor 60) and a control logic 92. The image data captured by camera 93 is first processed by ISP processor 91, which analyzes the image data to capture image statistics that can be used to determine one or more control parameters of camera 93. The camera 93 may include one or more lenses 932 and an image sensor 934. The image sensor 934 may include an array of color filters (e.g., Bayer filters), and the image sensor 934 may obtain light intensity and wavelength information captured by each imaging pixel and provide a set of original image data that may be processed by the ISP processor 91. The sensor 94 (e.g., gyroscope) may provide the collected image processing parameters (e.g., anti-shake parameters) to the ISP processor 91 based on the interface type of the sensor 94. The interface of the sensor 94 may be a Standard Mobile Imaging Architecture (SMIA) interface, other serial or parallel camera interface, or a combination of the above.

In addition, the image sensor 934 may also send the original image data to the sensor 94, which may provide the original image data to the ISP processor 91 based on the interface type of the sensor 94, or the sensor 94 may store the original image data in the image storage 95.

ISP processor 91 processes the original image data pixel by pixel in various formats. For example, each image pixel may have a bit depth of 8, 10, 12, or 14 bits, and ISP processor 91 may perform one or more image processing operations on the original image data to collect statistical information about the image data. The image processing operation can be performed with the same or different bit depth accuracy.

ISP processor 91 may also receive image data from image storage 95. For example, the sensor 94 interface sends the original image data to the image storage 95, which in turn provides the original image data to the ISP processor 91 for processing. The image storage 95 may be a storage 50, a portion of the storage 50, a storage device, or a separate dedicated memory within an electronic device, and may include Direct Memory Access (DMA) features.

ISP processor 91 may perform one or more image processing operations, such as time domain filtering, when receiving raw image data from an image sensor 934 interface or from a sensor 94 interface or from image storage 95. The processed image data may be sent to the image storage 95 for further processing before being displayed. ISP processor 91 receives the processed data from image storage 95 and performs image data processing on the processed data in the original domain and RGB and YCbCr color spaces. The image data processed by ISP processor 91 may be output to display 97 (display 97 may include display 83) for viewing by a user and/or further processed by a graphics engine or Graphics Processing Unit (GPU). In addition, the output of ISP processor 91 may also be sent to image storage 95, and display 97 may read image data from image storage 95. In an exemplary implementation, the image storage 95 may be configured to include one or more frame buffers. In addition, the output of ISP processor 91 may be sent to encoder/decoder 96 to encode/decode image data. The encoded image data can be saved and decompressed before being displayed on the display 97. Encoder/decoder 96 may be realized by a CPU or GPU or coprocessor.

The statistical data determined by ISP processor 91 may be sent to control logic 92. For example, the statistical data may include image sensor statistical information such as auto exposure, auto white balance, auto focus, flicker detection, black level compensation, lens shadow correction, etc. Control logic 92 may include processing elements and/or microcontrollers that execute one or more routines (e.g., firmware), the one or more routines may determine control parameters of camera 93 and ISP processor 91 based on the received statistical data. For example, the control parameters of the camera 93 may include sensor control parameters (e.g., gain, integration time of exposure control, anti-shake parameters, etc.), camera flash control parameters, lens control parameters (e.g., focal length for focusing or zooming), or combinations of these parameters. Control parameters of ISP processor 91 may include gain levels and color correction matrices for automatic white balance and color adjustment (e.g., during RGB processing), and lens shading correction parameters.

An implementation of the present disclosure also provides a computer readable storage medium on which a computer program is stored, which is executable by a processor to realize the imaging control method as described in any of the above implementations. For example, the following acts are performed: determining a target combination from a plurality of preset exposure level combinations according to a brightness of a shooting scene; wherein, one exposure level combination includes at least two exposure levels, and different exposure level combinations are different in at least one of the following aspects: quantities of exposure levels in the exposure level combinations, and values of exposure levels in the exposure level combinations; performing shooting according to each exposure level included in the target combination to obtain a corresponding image of each exposure level; and performing synthesis processing on images of a plurality of exposure levels of the target combination.

Implementations of the present disclosure provide an imaging control method, an electronic device and a computer readable storage medium. Thereby, synthesis processing can be performed on images with different exposure levels according to an environment brightness of a shooting scene, thus avoiding the situation that some region in an image is too bright or too dark.

In implementations of the present disclosure, according to the brightness of the shooting scene, a target combination can be determined, shooting can be performed according to each exposure level in the target exposure level combination, and synthesis processing can be performed on the resulting images of multiple exposure levels, thereby avoiding the situation that an image is too bright or too dark, hence improving the imaging effect and imaging quality, and improving the user's shooting experience.

In the description of this specification, description made with reference to terms "an implementation," "some implementations," "examples," "specific examples," or "some examples" and the like means that a specific feature, structure, material, or characteristic described in connection with the implementation or example is included in at least one implementation or example of the present disclosure. In this specification, the schematic representations of the above terms are not necessarily directed to the same implementation or example. Furthermore, the specific features, structures, materials, or characteristics described may be combined in any one or more implementations or examples in a suitable manner. In addition, those skilled in the art may combine the different implementations or examples and the features of the different implementations or examples described in this specification without contradicting each other.

Furthermore, the terms "first", "second" and "third" are used only for descriptive purposes and cannot be understood as indicating or implying relative importance or implicitly indicating the number of indicated technical features. Thus, the features defined as "first", "second" and "third" may explicitly or implicitly include at least one of the features. In the description of the present disclosure, the meaning of "a plurality of" is at least two, such as two, three, etc., unless otherwise explicitly and specifically limited.

Any process or method description in the flowchart or otherwise described herein may be understood as representing a module, segment, or portion of codes including one or more executable instructions for realizing acts of a particular logical function or process, and the scope of implementations of the present disclosure includes other realizations. The functions may be performed in an order different from the order shown or discussed here, including in a substantially-simultaneous manner or in a reverse order according to the functions involved, which should be understood by those skilled in the art to which the implementations of the present disclosure belong.

The logic and/or acts represented in the flowchart or otherwise described herein, for example, may be considered as a sequencing table of executable instructions for realizing logical functions, and may be embodied in any computer readable medium for use by or in connection with an instruction execution system, apparatus, or device (e.g., a computer-based system, a system including a processor, or other system that can fetch and execute instructions from an instruction execution system, apparatus, or device). In terms of this specification, "computer readable medium" may be any device that may contain, store, communicate, propagate, or transport a program for use by or in connection with an instruction execution system, apparatus, or device. More specific examples (non-exhaustive list) of computer readable media include the following: electrical connections (electronic devices) with one or more wirings, portable computer disk cartridges (magnetic devices), random access memory (RAM), read only memory (ROM), erasable editable read only memory (EPROM or flash memory), fiber optic devices, and portable optical disk read only memory (CDROM). In addition, the computer readable medium may even be paper or other suitable medium on which the program can be printed, because the program can be electronically obtained, for example, by optically scanning the paper or other medium, followed by editing, interpreting, or processing in other suitable ways if necessary, and then stored in a computer memory.

It should be understood that various parts of the present disclosure may be realized in hardware, software, firmware, or combinations thereof. In the above-described implementations, multiple acts or methods may be realized in software or firmware stored in memory and executed by a suitable instruction execution system. For example, if realized in hardware, as in another implementation, it can be realized by any one or a combination of the following techniques known in the art: discrete logic circuits with logic gates for realizing logic functions on data signals, application-specific integrated circuits with suitable combinational logic gates, programmable gate arrays (PGA), field programmable gate arrays (FPGA), etc.

Those of ordinary skill in the art may understand that all or part of the acts carried by the method for realizing the above implementations can be accomplished by instructing relevant hardware through a program that can be stored in a computer readable storage medium. The program, when executed, includes one or a combination of acts of the method implementations.

In addition, each functional unit in various implementations of the present disclosure may be integrated in one processing module, or each unit may exist physically alone, or two or more units may be integrated in one module. The above-mentioned integrated modules can be realized in the form of hardware or software functional modules. The integrated module can also be stored in a computer readable storage medium if it is realized in the form of a software functional module and sold or used as an independent product. The storage medium mentioned above may be read only memory, magnetic disk or optical disk, etc.

Although implementations of the present disclosure have been shown and described above, it can be understood that the above-mentioned implementations are exemplary and cannot be understood as limitations of the present disclosure, and those skilled in the art can make changes, modifications, substitutions and variations to the above-mentioned implementations within the scope of the present disclosure.

What is claimed is:

1. An imaging control method comprising:
    when a shooting scene is within a bright light environment, determining a preferred combination from a first type of exposure level combinations of a plurality of preset exposure level combinations, wherein the first type of exposure level combinations comprises at least three exposure levels;
    when the shooting scene is within a dark light environment, determining the preferred combination from a second type of exposure level combinations of the plurality of preset exposure level combinations, wherein the second type of exposure level combinations comprises at least two first exposure levels and at least one second exposure level, wherein a value of the first exposure level is greater than a value of the second exposure level;
    obtaining a plurality of images according to a plurality of exposure levels in the preferred combination; and
    performing synthesis processing on the obtained plurality of images.

2. The imaging control method according to claim 1, further comprising: obtaining an ISO value or an exposure time of a preview image in the shooting scene; and determining whether the shooting scene is within the bright light environment or the dark light environment according to the ISO value or the exposure time.

3. The imaging control method according to claim 2, wherein determining whether the shooting scene is within the bright light environment or the dark light environment according to the ISO value or the exposure time comprises:
    when the ISO value is less than or equal to a first parameter threshold, or the exposure time is less than or equal to a second parameter threshold, determining that the shooting scene is within the bright light environment; and
    when the ISO value is greater than the first parameter threshold or the exposure time is greater than the second parameter threshold, determining that the shooting scene is within the dark light environment.

4. The imaging control method according to claim 1, wherein determining the preferred combination from the first type of exposure level combinations of the plurality of preset exposure level combinations comprises:
    determining the preferred combination from the first type of exposure level combinations of the plurality of preset exposure level combinations according to at least one of following factors: whether a preview image in the shooting scene contains a human face, and a dynamic range of the preview image.

5. The imaging control method according to claim 4, wherein when the shooting scene is within the bright light environment, a maximum value of exposure levels in a corresponding preferred combination when a preview image contains a human face is less than or equal to a maximum value of exposure levels in a corresponding preferred combination when a preview image does not contain a human face, and a minimum value of exposure levels in a corresponding preferred combination when a preview image contains a human face is less than or equal to a minimum value of exposure levels in a corresponding preferred combination when a preview image does not contain a human face, when dynamic ranges of the preview images are the same.

6. The imaging control method according to claim 4, further comprising:
    determining the dynamic range of the preview image according to a brightness histogram of the preview image or according to a brightness of each region in the preview image.

7. The imaging control method according to claim 6, wherein the dynamic range comprises a first dynamic range, a second dynamic range, and a third dynamic range, the first dynamic range is wider than the second dynamic range, and the second dynamic range is wider than the third dynamic range.

8. The imaging control method according to claim 6, wherein determining the dynamic range of the preview image according to the brightness histogram of the preview image comprises:
    determining the dynamic range of the preview image according to a proportion of a quantity of pixels at each brightness level in the brightness histogram.

9. The imaging control method according to claim 1, wherein determining the preferred combination from the second type of exposure level combinations of the plurality of preset exposure level combinations comprises:
    determining at least one exposure level combination in which the value of the first exposure level is a preset target value from the second type of exposure level combinations; and
    determining the preferred combination from the at least one exposure level combination according to at least one of following factors: whether a preview image in the shooting scene contains a human face, and a dynamic range of the preview image.

10. The imaging control method according to claim 9, wherein when the shooting scene is within the dark light environment, the value of the second exposure level in a corresponding preferred combination when a preview image contains a human face is less than or equal to the value of the second exposure level in a corresponding preferred combination when a preview image does not contain a human face, when dynamic ranges of the preview images are the same.

11. The imaging control method according to claim 1, wherein the at least three exposure levels included in the first type of exposure level combinations have different values from each other.

12. An electronic device comprising: a storage, a processor, and a computer program stored in the storage and executable by the processor to perform acts of:
    when a shooting scene is within a bright light environment, determining a preferred combination from a first type of exposure level combinations from a plurality of preset exposure level combinations according to a brightness of the shooting scene, wherein the first type of exposure level combinations comprises at least three exposure levels;
    when the shooting scene is within a dark environment, determining the preferred combination from a second type of exposure level combinations from the plurality of preset exposure level combinations, wherein the second type of exposure level combinations comprises at least two first exposure levels and at least one second exposure level, wherein a value of the first exposure level is greater than a value of the second exposure level;

obtaining a plurality of images according to a plurality of exposure level levels in the preferred combination; and performing synthesis processing on the obtained plurality of images.

13. The electronic device according to claim 12, wherein the processor, when executing the computer program, further performs acts of:

obtaining an ISO value or an exposure time of a preview image in the shooting scene; and determining whether the shooting scene is within the bright light environment or the dark light environment according to the ISO value or the exposure time.

14. The electronic device according to claim 12, wherein the processor, when executing the computer program, performs acts of:

determining the preferred combination from the first type of exposure level combinations according to at least one of following factors: whether a preview image in the shooting scene contains a human face, and a dynamic range of the preview image.

15. The electronic device according to claim 14, wherein when the shooting scene is within the bright light environment, a maximum value of exposure levels in a corresponding preferred combination when a preview image contains a human face is less than or equal to a maximum value of exposure levels in a corresponding preferred combination when a preview image does not contain a human face, and a minimum value of exposure levels in a corresponding preferred combination when a preview image contains a human face is less than or equal to a minimum value of exposure levels in a corresponding preferred combination when a preview image does not contain a human face, when dynamic ranges of the preview images are the same.

16. The electronic device according to claim 15, wherein the processor, when executing the computer program, performs acts of: determining at least one exposure level combination in which the value of the first exposure level is a preset target value from the exposure level combinations of the second type; and determining the preferred combination from the at least one exposure level combination according to at least one of following factors: whether a preview image in the shooting scene contains a human face, and a dynamic range of the preview image.

17. The electronic device according to claim 16, wherein when the shooting scene is within the dark light environment, the value of the second exposure level in a corresponding preferred combination when a preview image contains a human face is less than or equal to the value of the second exposure level in a corresponding preferred combination when a preview image does not contain a human face, when dynamic ranges of the preview images are the same.

18. A non-transitory computer readable storage medium having stored thereon a computer program that is executable by a processor to perform acts of:

when a shooting scene is within a bright light environment, determining a preferred combination from a first type of exposure level combinations from a plurality of preset exposure level combinations, wherein the first type of exposure level combinations comprises at least three exposure levels;

when a shooting scene is within a dark light environment, determining the preferred combination from a second type of exposure level combinations from the plurality of preset exposure level combinations, wherein the second type of exposure level combinations comprises at least two first exposure levels and at least one second exposure level, wherein a value of the first exposure level is greater than a value of the second exposure level;

obtaining a plurality of images according to a plurality of exposure level levels in the preferred combination; and performing synthesis processing on the obtained plurality of images.

* * * * *